United States Patent [19]

Schewe

[11] Patent Number: 4,941,975

[45] Date of Patent: Jul. 17, 1990

[54] STAR-SHAPED FILTER NOZZLE

[75] Inventor: Hermann Schewe, Hiddenhausen, Fed. Rep. of Germany

[73] Assignee: Kleemeier, Schewe & Co. KSH GmbH, Herford, Fed. Rep. of Germany

[21] Appl. No.: 337,817

[22] Filed: Apr. 14, 1989

[30] Foreign Application Priority Data

Apr. 26, 1988 [DE] Fed. Rep. of Germany ... 8805521[U]

[51] Int. Cl.$^5$ ............................................. B01D 27/08
[52] U.S. Cl. .................................. 210/232; 210/289; 210/345; 210/457
[58] Field of Search ................. 210/232, 323.1, 323.2, 210/330, 345, 457, 458, 288, 289, 279, 291, 332, 333.01, 333.1

[56] References Cited

U.S. PATENT DOCUMENTS

| | | | |
|---|---|---|---|
| 2,816,664 | 12/1957 | Haynes | 210/345 |
| 3,747,768 | 7/1973 | Barrera | 210/289 |
| 4,608,162 | 8/1986 | Hankes et al. | 210/232 |
| 4,608,168 | 8/1986 | Moore | 210/289 |
| 4,678,572 | 7/1987 | Hehl | 210/232 |

FOREIGN PATENT DOCUMENTS 5372  3/1901  United Kingdom ................ 210/345

*Primary Examiner*—Frank Spear
*Assistant Examiner*—Joseph Drodge
*Attorney, Agent, or Firm*—Pollock, Vande Sande & Priddy

[57] ABSTRACT

A star-shaped filter nozzle has a central member and filter nozzle arms radially protruding therefrom. Each of the filter nozzle arms has one end removably connected in a lateral opening of the central member. The portions of the filter nozzle arms and central member connecting other are adapted to form complementary parts of a bayonet lock.

4 Claims, 1 Drawing Sheet

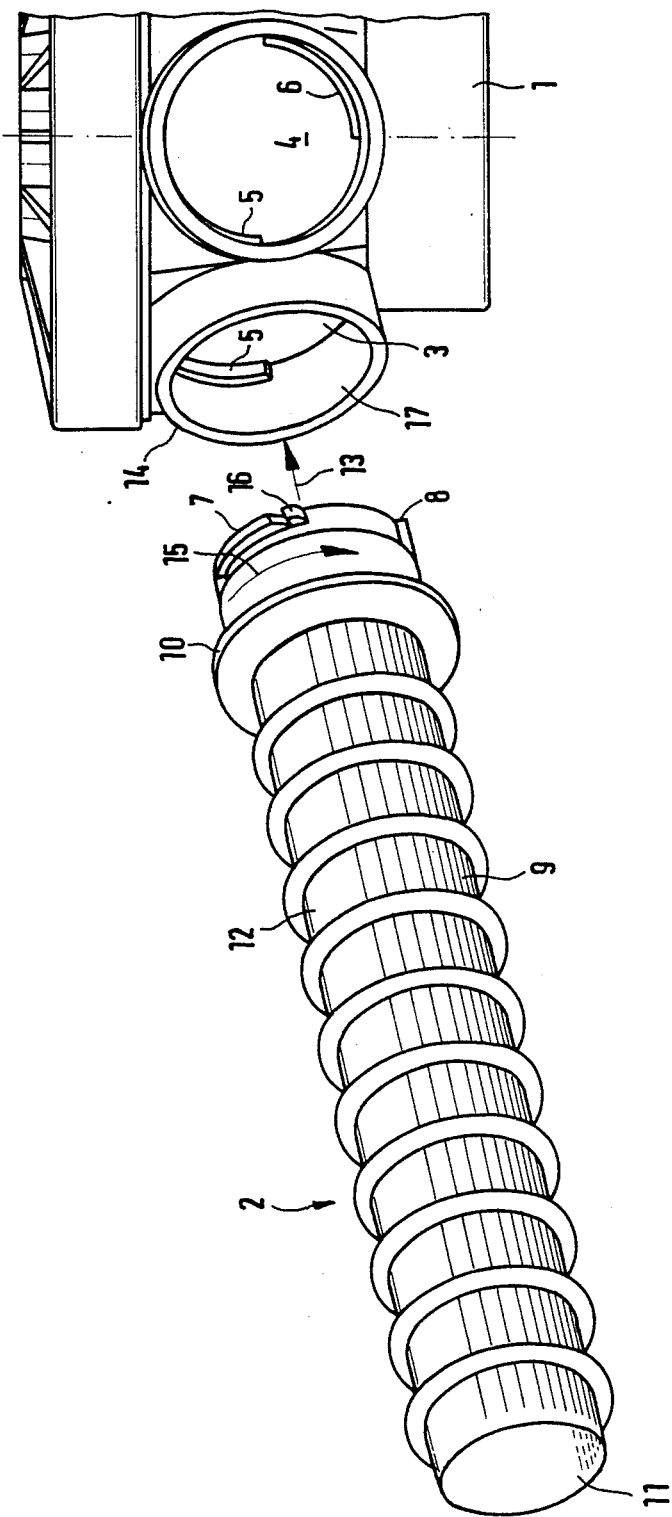

STAR-SHAPED FILTER NOZZLE

FIELD OF THE INVENTION

The present invention concerns a star-shaped filter nozzle having a central element and filter nozzle arms protruding radially from the central element. The nozzle arms are removably attached at one end in lateral openings of the central element.

BACKGROUND OF THE INVENTION

Star-shaped filter nozzles with filter nozzle arms that are firmly glued to a central element are known. Such star-shaped filter nozzles can only be installed in containers which have a sufficiently large mounting opening.

Also known are star-shaped filter nozzles with a central element to which the filter nozzle arms are removably attached. In one such nozzle, the lateral openings of the central element and the end of the filter nozzle arms are threaded. The connecting filter nozzle arms are connected to the central element in the inserted state in the container by screwing them in. Such a screwing in, is in practice difficult as the available installation and mounting space in most cases are severely limited. Another disadvantage of this design is due to the fact that it is not readily adaptable for securing the filter nozzle arms in a predetermined inserted position. For example, fastening a nozzle arm in a certain position may be necessary when the filter nozzle arms have nozzle slits which are not evenly distributed around the entire circumference of the nozzle arm.

Finally, filter nozzle arms which are screwed in place have the disadvantage that they can unintentionally loosen in case of vibration.

In another known embodiment, the filter nozzle arms are merely snapped into the respective holding borings of the star-shaped filter nozzle by means of a snap connection. However, this snap connection has the disadvantage that it does not provide sufficient security against high or abrupt impact which may separate filter nozzle arms from the central element.

SUMMARY OF THE INVENTION

The present invention is concerned with the problem of constructing a star-shaped filter nozzle of the known type in such a manner that permits a rapid and secure connection between the nozzle arms and the central element in a predetermined position of the filter nozzle arms. For this purpose, making the connection should also be easily possible inside the filter container.

The problem is solved by the fact that the portions of the filter nozzle arms and of the central part contacting each other form complementary parts of a bayonet lock.

In a preferred embodiment of the present invention locking protrusions are provided on the filter nozzle arms and/or their counter locking surfaces on the central element which are designed for securing the nozzle arm in the desired rotated end position.

According to another embodiment of the invention, the locking protrusions are radially protruding protrusions on the nozzle arms which extend behind counter locking parts provided on the central element.

The star-shaped filter nozzle according to the invention combines the advantages of all known solutions without their respective disadvantages. It permits the rapid installation as well as removal of the filter nozzle arms inside the filter nozzle container. In addition, the rotation positions of the filter nozzle arms when they are locked are precisely given. This permits a rotation oriented installation of the filter nozzle arms, as is required when nozzle slits do not extend over the whole circumference of the filter nozzle arms, for example, to permit a liquid to flow from the nozzle only in a preferred direction.

Below a preferred embodiment of the invention is described in detail based on the drawing.

BRIEF DESCRIPTION OF THE DRAWING

The drawing shows, in perspective exploded view, a part of a central element with one of a number of provided filter nozzle arms.

DETAILED OF THE PREFERRED EMBODIMENT(S)

The central element, designated by 1, has on its lateral circumference several discharge openings, of which only discharge openings 3 and 4 are shown. Provided in the discharge opening are ribs 5 and 6 which, together with corresponding counter ribs 7 and 8 on the filter nozzle arms, for a bayonet lock. The filter nozzle arms have filter nozzle slits 9, which extend from a flange 10 to the end 11. In the shown embodiment, the filter nozzle slits run longitudinally only along half the circumference. The nozzle at the other half of the circumference, beginning at reference number 12, is closed, as is the end 11.

For inserting the filter nozzle arm 2 into the central element, the former is pushed in a direction of arrow 13 until the flange 10 contacts the collar 14 and it is then rotated in the direction of arrow 15. In the final rotation position, a locking nose 16 is positioned behind a protrusion (not shown) in the flange 17 of the opening 3 and secures the filter nozzle arm 2 in the final rotation position in such a manner that a reverse rotation is possible, but difficult.

I claim:

1. A star-shaped filter nozzle comprising a central, tubular element having a plurality of lateral openings and a plurality of filter nozzle arms radially protruding from said openings in said central member, each of said arms having an inner end removably inserted into lateral openings of said central member, wherein interconnecting elements on said filter nozzle arms and on said central member form complementary parts of a bayonet lock.

2. A star-shaped filter nozzle according to claim 1, wherein said interconnecting elements on said filter nozzle arms and said central member include locking protrusions which are designed for securing the nozzle arms in a predetermined final rotated position.

3. A star-shaped filter nozzle according to claim 1, wherein said interconnecting elements on said filter nozzle arms are locking protrusions which are radially protruding protrusions which extend behind said interconnecting elements on said central member.

4. A star-shaped filter nozzle according to claim 3, wherein said locking protrusions are radially protruding protrusions on said filter nozzle arms which reach behind said locking protrusions on said central member.

* * * * *